United States Patent
Lang

(10) Patent No.: US 7,418,834 B2
(45) Date of Patent: Sep. 2, 2008

(54) SYSTEM, METHOD, AND APPARATUS FOR INTERCHANGEABLY ACCOMMODATING BOTH FIXED AND FLOATING TAKEOUT INSERTS

(75) Inventor: David Jack Lang, Rhome, TX (US)

(73) Assignee: Poco Graphite, Inc., Decatur, TX (US)

( * ) Notice: Subject to any disclaimer, the term of this patent is extended or adjusted under 35 U.S.C. 154(b) by 400 days.

(21) Appl. No.: 11/108,377

(22) Filed: Apr. 18, 2005

(65) Prior Publication Data

US 2006/0230789 A1 Oct. 19, 2006

(51) Int. Cl.
*C03B 9/04* (2006.01)
(52) U.S. Cl. .............................. 65/260; 65/129; 65/171; 428/137; 428/256; 428/337; 294/86.4; 294/902; 269/283; 269/284; 269/268; 269/286
(58) Field of Classification Search .................. 65/260, 65/129, 219; 428/137, 138, 266, 337, 429; 294/86.4, 902; 269/283, 284, 268, 286
See application file for complete search history.

(56) References Cited

U.S. PATENT DOCUMENTS

| 1,911,119 | A | * | 5/1933 | Ingle ........................... 65/219 |
| 4,865,897 | A |   | 9/1989 | Bode et al. |
| RE34,953 | E |   | 5/1995 | Denney et al. |

FOREIGN PATENT DOCUMENTS

GB 2 126 211 A 3/1984

* cited by examiner

*Primary Examiner*—Mark Halpern
(74) *Attorney, Agent, or Firm*—Bracewell & Giuliani LLP

(57) ABSTRACT

A takeout jaw for handling glass bottles includes a holder for both fixed and floating inserts. This design allows an insert to be in a fixed position when the insert is provided with a nominal thickness. When a floating insert of a lesser thickness is installed, the spring clip does not engage the floating insert, which allows the floating insert to move vertically or float. The takeout holder contains either type of insert within the pocket with retaining clips that engage chamfers formed on the inserts.

8 Claims, 6 Drawing Sheets

SYSTEM, METHOD, AND APPARATUS FOR INTERCHANGEABLY ACCOMMODATING BOTH FIXED AND FLOATING TAKEOUT INSERTS

BACKGROUND OF THE INVENTION

1. Technical Field

The present invention relates in general to a fixture for glassmaking and, in particular, to an improved system, method, and apparatus for lifting hot glass bottles from molds in which they are formed with a nonmetallic material that is capable of being both fixed and floating relative to a fixture.

2. Description of the Related Art

Hot glass, especially when formed into various shapes in the manufacture of glass containers (e.g., bottles), is susceptible to being damaged by contact with glass processing equipment. Most of the equipment that contacts the hot glass in the hot end process area during the manufacture of glass bottles is fabricated from metallic materials (e.g., stainless steel and other alloys). However, in certain areas of the hot end processing of glass bottles, it has been found desirable to utilize non-metallic materials such as graphite, asbestos, plastics or carbon fibers.

One such application is in fixtures used to lift hot, newly formed bottles from the mold in which they are formed and set them down on an air pad for cooling before being conveyed to an annealing furnace. These fixtures are called takeout jaws or tongs. Since metallic takeout jaws may cause scratching or checking by contact with the hot formed bottles, takeout jaws are frequently fabricated with a non-metallic insert for contacting the hot glass. Checking is the formation of imperceptible cracks due to sudden localized heat transfer or thermal shock. Non-metallic inserts can significantly reduce checking and scratching. This is particularly important in the current production of light weight, fragile bottles that require gentler handling.

Of the materials which have been used as inserts for takeout jaws, the most satisfactory to date has proven to be graphite. Although other non-metallic materials have been used, most of such non-metallic materials are not completely suitable for use in lifting the hot containers from the molds. Asbestos, which was used at one time, has proven to be undesirable for safety and environmental reasons. Plastics suitable for use at the high temperatures encountered in the hot end process area must be specially formulated and also have a relatively short service life. In contrast, graphite possesses properties that are particularly well suited for contacting hot glass containers. Graphite properties include high strength, resistance to oxidation, non-abrasive surface integrity, heat resistance, low porosity, and long service life.

One of the disadvantages of conventional takeout jaws was the frequent need to replace parts that were worn out from routine use in the bottle-forming machine. This wear was caused largely by the movement of takeout jaw inserts within the jaw. Inserts were commonly held in position by steel detent balls positioned in holes in the takeout jaws. Detent balls were subject to wear and fouling due to the accumulation of grease, oil, and other foreign matter. The detent balls tended to hang up in their holes and permit the insert to fall out, causing loss of the insert and loss of production. Detent balls seldom provided sufficient fit for the insert to render the insert immovable within the jaw. Therefore, a limited amount of vertical movement or "float" between the insert and jaw was almost always present.

Coupled with the fact that jaws having close tolerances could not be readily fabricated from cast bronze, the form of takeout jaws conventionally manufactured, the play between the jaw and insert resulted in wear of the insert and necessitates frequent replacement. Because of the lack of close tolerances in the takeout jaws, replacement of both inserts from a pair of takeout jaws was typically necessary. p In U.S. Pat. No. Re. 34,953, the inserts for the takeout jaws are "fixed" and do not permit float. That patent discloses takeout jaws that reduce the wear on inserts and in which the inserts can be readily replaced in the event of wear or damage without having to replace parts of the jaws themselves. Thus, bottle makers have had two choices in takeout holders: floating and fixed. The criteria for selecting the type of holder includes, for example, the condition of the bottle making machine, the type of finish required, and the skill level of the workers.

Fixed holders hold the insert tightly in the holder's pocket via a spring clip, while floating holders allow the insert to move vertically. The float is accomplished by reducing the thickness of the insert by 0.020 to 0.050 inches less than the pocket of the holder. The insert is contained in the pocket with ball bearings that protrude into the pocket from both sides and corresponding grooves in the insert. Although these two separate designs are workable, it would be advantageous and desirable to provide a single design that accommodates both fixed and floating takeout insert holders.

SUMMARY OF THE INVENTION

One embodiment of a system, method, and apparatus for handling glass bottles includes a holder for both fixed and floating inserts. This design allows an insert to be in a fixed position while at a first thickness of a fixed insert (e.g., 0.250 inches). When the insert is at or below 0.230 inches thick, the spring clip no longer engages the insert, which allows the insert to move vertically or float. The present invention contains the insert within the pocket with chamfers formed on the parting line of the holder. Retaining clips affixed to the holder are used to retain the insert in the pocket. In addition, an insert blank may be used in conjunction with the inserts. The function of the insert body changes between the fixed and floating configurations by changing the thickness.

In the fixed configuration, the takeout jaws hold a piece of non-metallic contact material under spring tension in a manner such that the contact material does not move within the takeout jaws upon contacting a hot glass container. Because the contact material is held securely in position by spring tension, it is possible to lift the hot containers in a manner such that damage to the containers is minimized. Thus, the takeout jaws can be machined to close tolerances enabling the container lifting machine to operate as a precision machine. Because of the resulting gentle handling of the hot containers, it has become feasible to produce lighter weight glass containers and to increase the efficiency and output.

One embodiment of a takeout jaw of the present invention comprises a generally arcuate holder for an arcuate piece of nonmetallic contact material, means at the middle of the arc formed by said arcuate holder for holding said arcuate piece immovably within said arcuate holder, and means integral with said holder for attaching the jaw to a support therefor. The takeout jaws of the present invention permit higher bottle yields and decrease the need for replacement of the contact material inserts.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

The design of the takeout jaw of the present invention permits machining to close tolerances, thereby ensuring accurate and precise set up for bottle forming machines. The precision machining of the takeout jaws combined with the tightness of the insert in the pocket of the jaw that contains the insert enables the takeout jaws to be accurately located on the bottle in a reproducible manner. This design reduces deformation of the bottle finish at the top of the bottle due to misalignment and, consequently, the number of bottles which must be scrapped. When threaded finishes are required, the inserts contact the threaded finish only at the root and on the underside of the threads to further decrease the likelihood of damage.

The machine fabrication of the takeout jaws of the present invention eliminates the high cost of tooling of the cast takeout jaws of the prior art and enables economic production even in relatively small quantities. In the prior art, the cast bronze takeout jaws of the prior art had to be manufactured in quantities of thousands of units to justify the high initial cost of tooling. In contrast, the machined takeout jaws of the present invention can be manufactured economically in quantities as low as hundreds of units. Furthermore, the arcuate or semicircular shape of the takeout jaws of the present invention lends itself to being turned on a lathe. In addition, the number of parts required for the spring clip that retains the insert within a semicircular pocket in the takeout jaw is three, including spring, bolt, and washer, for each takeout jaw compared to eight for the detent ball retainer, which requires two detent ball assemblies per jaw, each consisting of ball, leaf spring retainer, screw and washer.

One of the major modes of insert failure is chipping of the surface of the insert. More precise mating of the insert with the bottle finish is ensured by close tolerance machining. Such machining is possible because of the semicircular design of the insert of the present invention, which reduces the risk of chipping. The semicircular design of the pocket in which the insert is retained and the semicircular configuration of the insert ensure that maximum surface contact between jaw and insert is realized. Since the insert contacts a large surface area of the pocket in the jaw and since the insert is held immovably within the pocket by the insert retaining spring, which is positioned at the center of the semicircular pocket, there is no play between the insert and takeout jaw. Thus, abrasion of the bottom surface of the insert caused by such play is eliminated. Precise alignment of the takeout jaws and bottles is thereby maintained while reducing damage to bottles and increasing the life of the insert.

Figure 1:
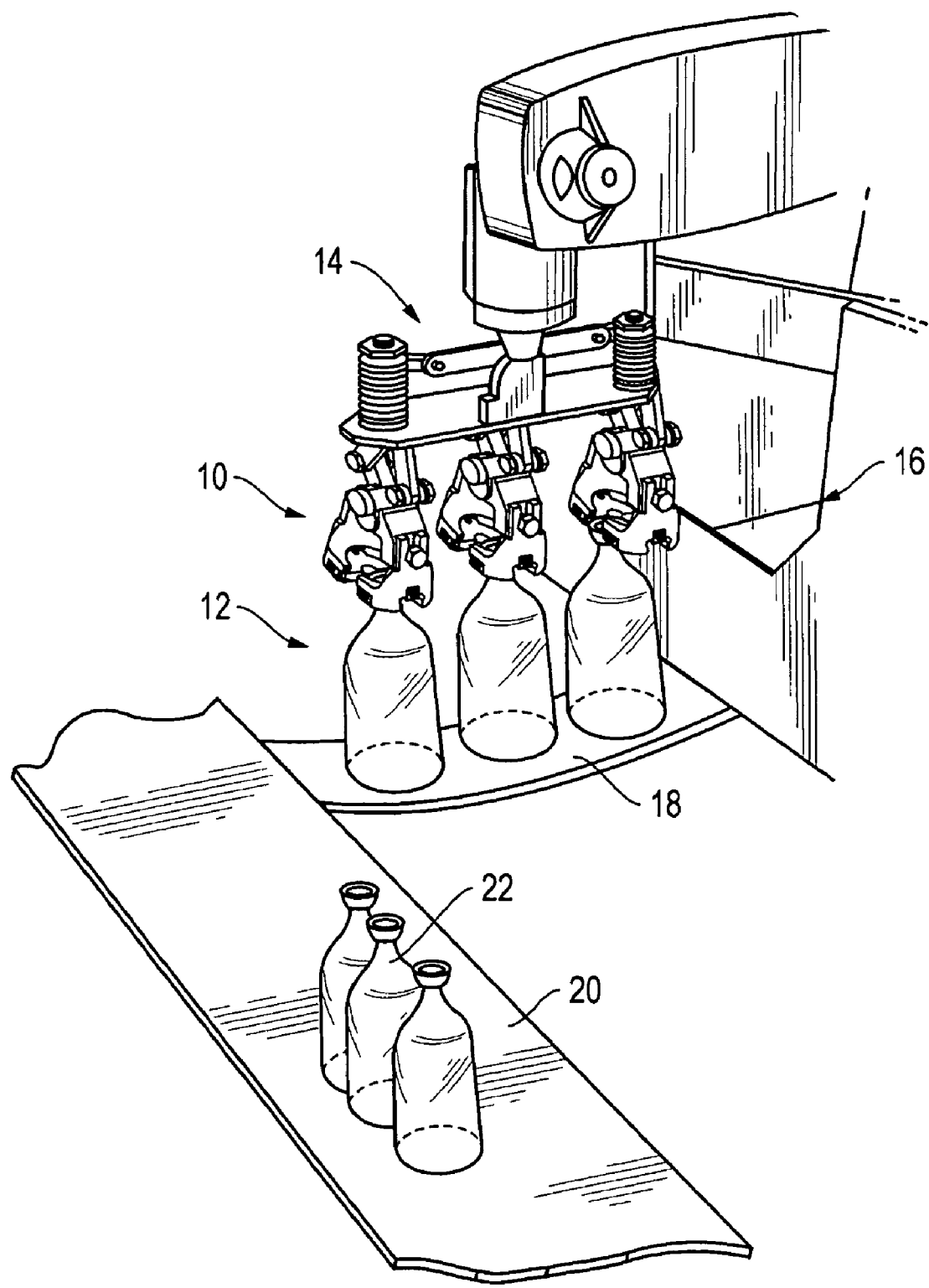
FIG. 1 is a schematic drawing of the takeout area of a bottle-making machine showing takeout jaws in position over recently formed glass bottles.

Referring to the drawings, FIG. 1 depicts a typical production environment in which the takeout jaws of the present invention are used. The number 10 represents a series of the takeout jaws of the present invention, which are positioned above a series of hot bottles 12. Takeout jaws 10 are connected to a lifting arm 14. Bottles 12 have just been removed from a bottle forming mold 16 and are suspended just above air pad 18 by a cushion of air, the source of which is not illustrated. Hot bottles 12, which were red hot when lifted out of the mold by takeout jaws 10, are cooled upon air pad 18 and then transferred to a conveyor belt 20 for transport to an annealing furnace, also not illustrated. Cooled bottles 22 are shown upon conveyor belt 20.

Figure 2:
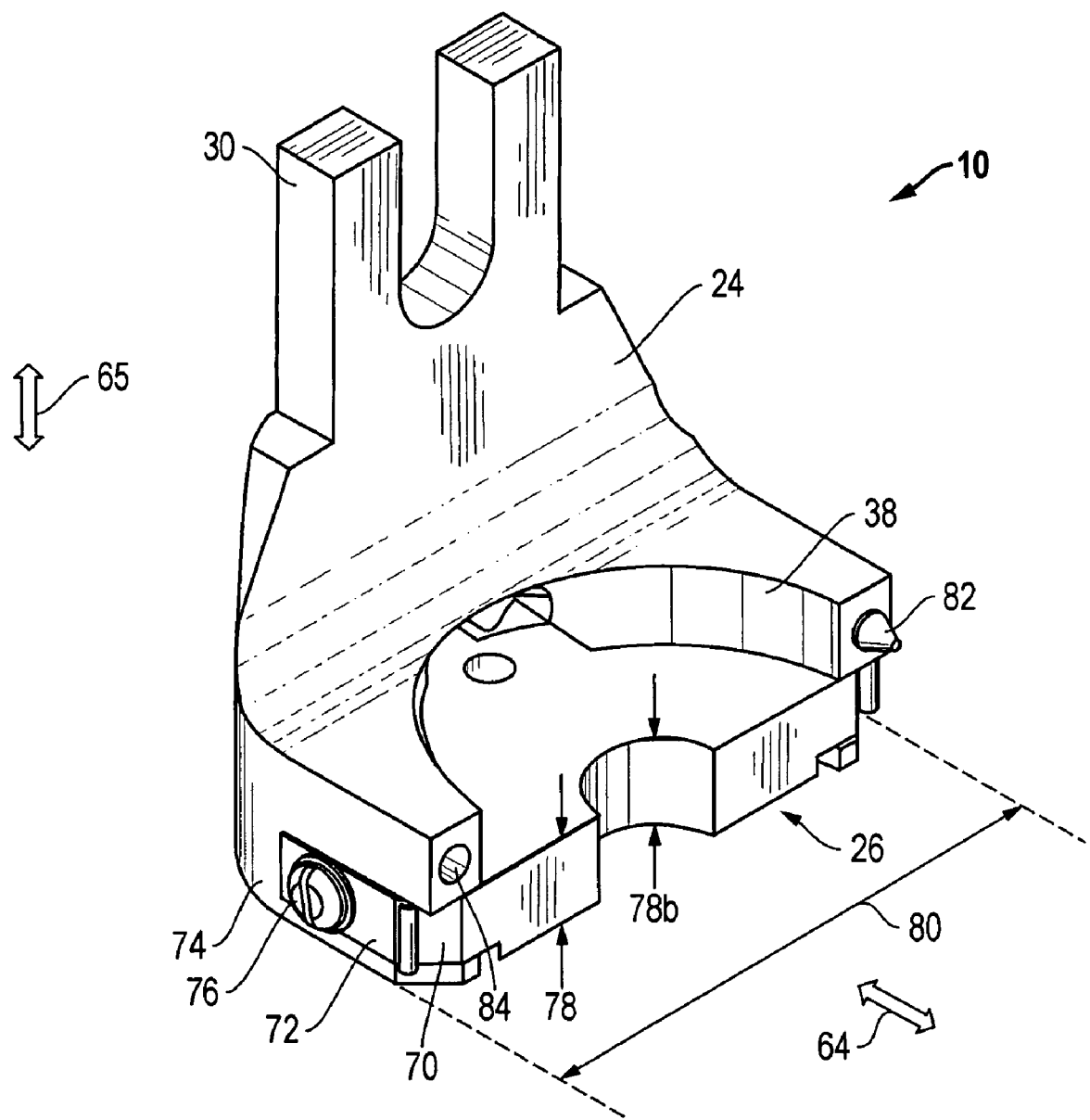
FIG. 2 is an isometric view of one embodiment of a takeout jaw and insert showing the insert removed from the jaw and is constructed in accordance with the present invention.
Figure 3:
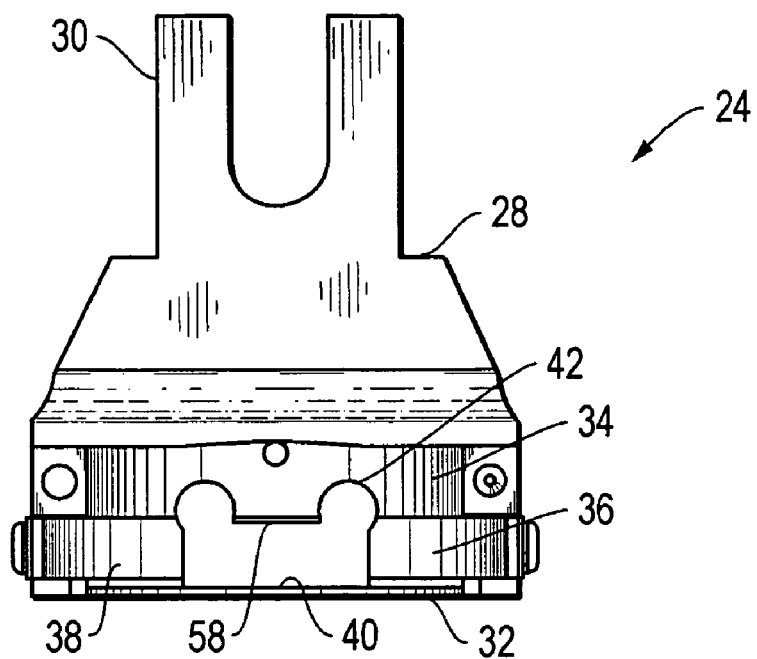
FIG. 3 is a front view of a takeout jaw of the present invention with the insert removed.

Referring to FIGS. 2 and 3, one embodiment of a single takeout jaw 24 and mating insert 26 constructed in accordance with the present invention is shown. Takeout jaw 24 has a semicircular body 28 and a yoke 30 for attachment to a lifting arm 14 (FIG. 1). Body 28 has a base 32 and a shelf 34 that form between them a semicircular pocket 36. Pocket 36 is open at the front and closed at the rear by semicircular back wall 38 of body 28 except for an opening 40 in the center of back wall 38. A center portion 42 in the lower surface of shelf 34 is cut out to provide clearance for a spring clip 58 (FIG. 3). The spring clip 58 is located in opening 40 at center portion 42.

In the embodiment shown, insert 26 is generally semicircular in form except for a lug 44 formed by cutting notches in the back wall 46 of insert 26. The upper surface 48 of insert 26 has a depression 50 with a hole 52 in the bottom thereof. Hole 52 is used for locating or fixturing purposes in machining insert 26 to the desired dimensions. The front surface 54 is generally semicircular except for two flat portions 56 at either end of the semicircle. If desired, front surface 54 can be threaded to provide a convenient means for contacting bottles having threaded finishes.

Figure 4:
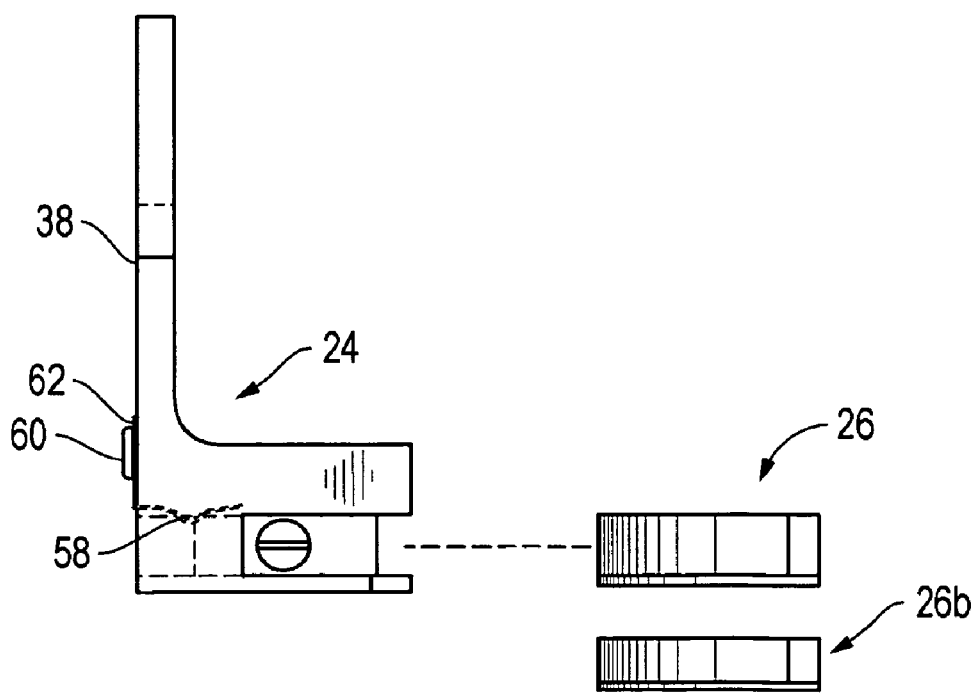
FIG. 4 is a partially sectioned side view of a takeout jaw and insert of the present invention showing the insert removed from the jaw.
Figure 5:
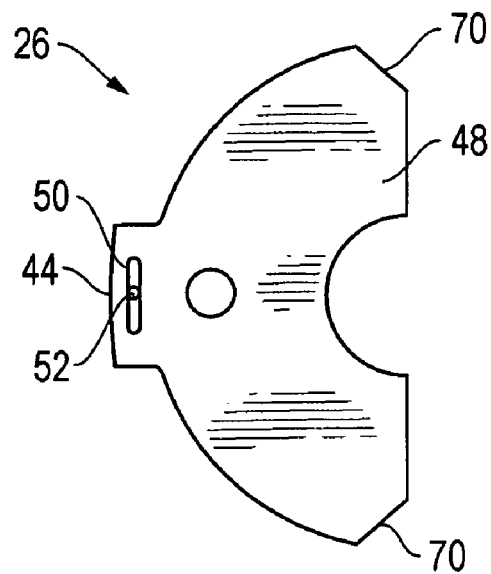
FIG. 5 is a top view of an insert of the present invention.

FIG. 4 shows the several horizontal surfaces in phantom and also shows that one embodiment of the insert is adapted to be positioned within the pocket in the takeout jaw and that the spring clip and depression in the insert are lined up to be engaged. Spring clip 58 is attached to back wall 38 of takeout jaw 24 by means of a screw 60 and a washer 62.

Figure 6:
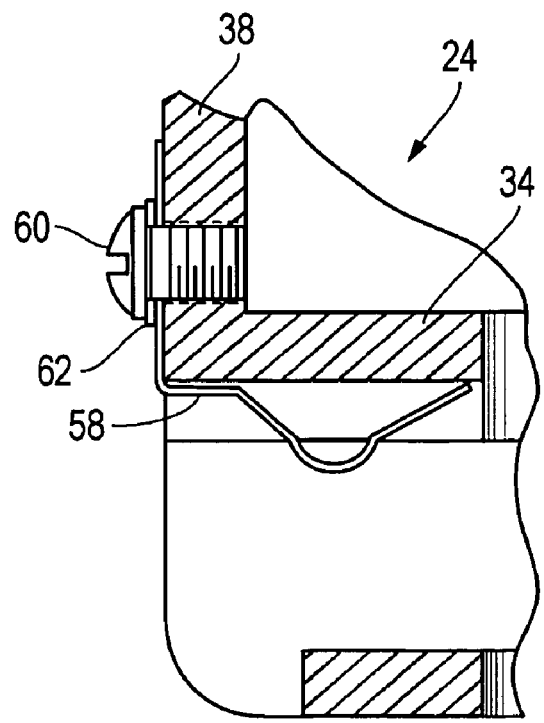
FIG. 6 is an enlarged sectional side view of a portion of a takeout jaw of the present invention show the spring in its untensioned condition.
Figure 7:
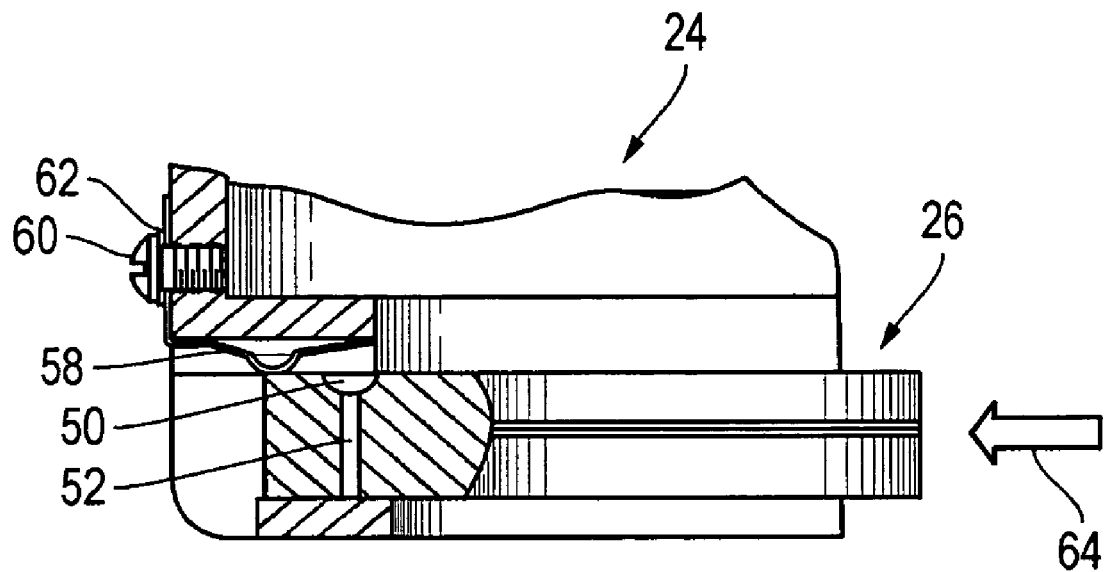
FIG. 7 is an enlarged sectional side view of a portion of a takeout jaw and partially mated insert showing the spring in its fully tensioned condition.
Figure 8:
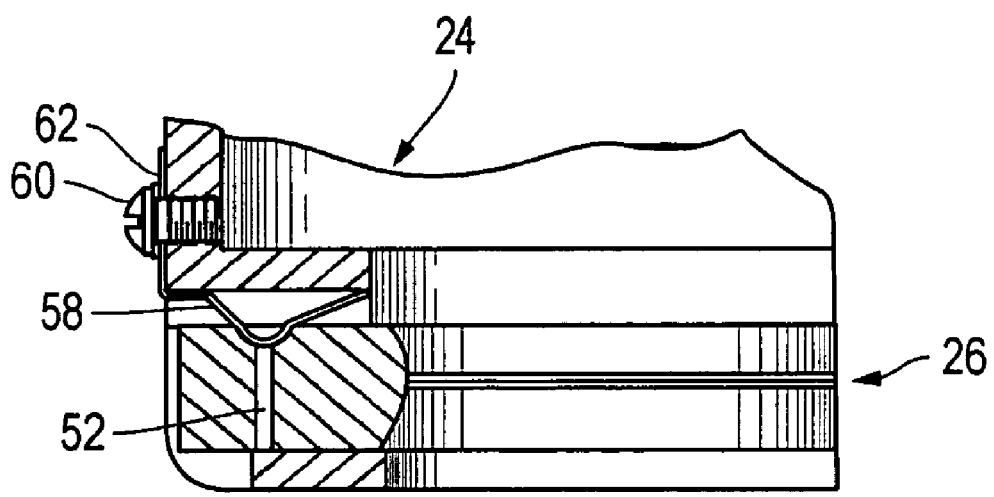
FIG. 8 is an enlarged sectional side view of a portion of a takeout jaw and fully mated insert showing the spring in its untensioned condition.

FIGS. 5, 6, 7 and 8 illustrate how one embodiment of the insert fits within the takeout jaw. The spring clip 58 is normally untensioned as shown in FIG. 6. As the insert 26 is pushed in the direction shown by arrow 64 (FIG. 7), the lug 44 engages spring clip 58 and causes it to become tensioned.

Then, when the insert is pushed all the way in (FIG. 8), spring clip 118 is snapped into depression 50 and becomes untensioned as in FIG. 6. Removal of insert 26 from takeout jaw 24 requires exertion of a large force to tension spring clip 58 and allow removal of insert 26 from takeout jaw 24.

In one embodiment, graphite is used to fabricate the takeout jaw inserts of the present invention. Various grades of graphite are commercially available. A particularly desirable material is a fine particle, high strength, isotropic graphite available from Poco Graphite, Inc., Decatur, Texas, which is sold as GLASSMATE® graphite contact material.

In one embodiment, the present invention is ideally suited for providing a takeout jaw assembly 10 comprising a takeout jaw 24 having a pocket 36 that interchangeably accommodates both fixed and floating inserts. The pocket 36 is oriented in a first direction (see arrow 64 in FIG. 7), and defines a second direction (arrow 65) perpendicular to the first direction 64. Fixed retention means (such as a spring clip 58) is mounted to the takeout jaw 24 and extends into the pocket 36 in the second direction 65. A fixed insert 26 has depression 50 and chamfers 70 formed therein for use in a fixed configuration such that the fixed insert 26 is located in the pocket 36 and the spring clip 58 engages the depression 50 to retain the fixed insert 26 in the takeout jaw 24 to prevent motion of the fixed insert 26 in the second direction 65.

A floating insert 26b (FIG. 4) also has chamfers 70 formed therein and a floating configuration such that the floating insert 26b is located in the pocket 36 and the spring clip 58 is out of contact or free of engagement with the floating insert 26b to allow a range of motion (e.g., approximately 0.020 to 0.050 inches) of the floating insert 26b in the second direction 65.

The takeout jaw 24 also has retaining clips 72 mounted to sides 74 (e.g., lateral sides) of the takeout jaw adjacent the pocket 36 (e.g., with screws 76) for engaging the chamfers 70 of either the fixed insert 26 or the floating insert 26b and retaining said either the fixed insert 26 or the floating insert 26b in the pocket 36 while in their respective configurations. In one embodiment, the fixed insert 26 has a fixed dimension 78 extending in the second direction 65 and the floating insert 26b has a floating dimension 78b extending in the second direction 65 that is less than the fixed dimension 78. In one embodiment, the takeout jaw 24 has a width dimension 80 that is perpendicular to both the first and second directions 64, 65, and the width dimension 80 is less than that of conventional takeout jaws (e.g., approximately 2.0 inches or less). In addition, one embodiment of the takeout jaw 24 has a locating pin 82 and a locating hole 84 that are offset from the pocket 36 in the second direction 65.

Figure 9:
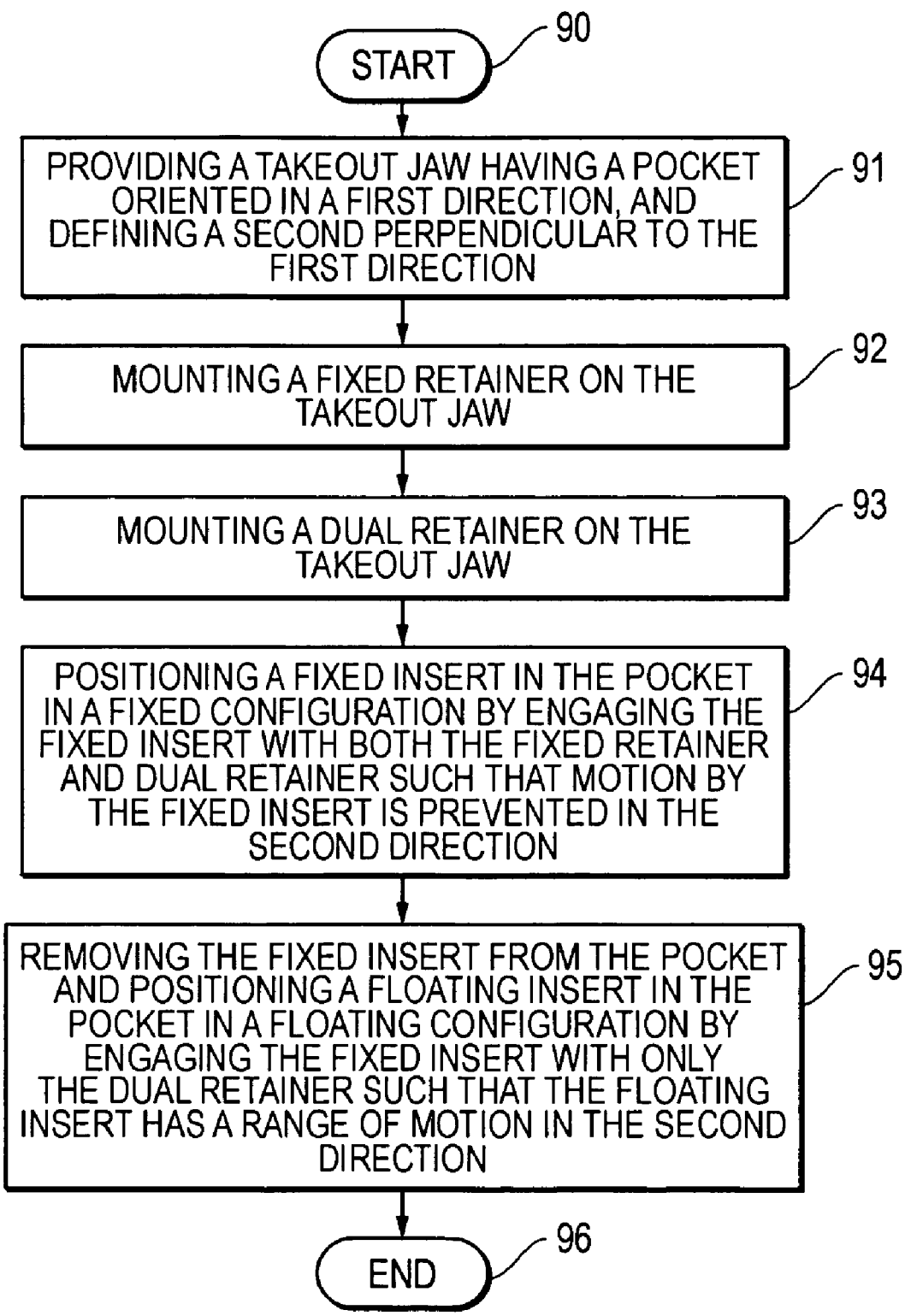
FIG. 9 is a high level flow diagram of one embodiment of a method constructed in accordance with the present invention.

In operation, one embodiment of a method of the present invention comprises providing interchangeable fixed and floating inserts for a takeout jaw assembly. As shown in FIG. 9, the method starts as indicated at step 90, and comprises providing a takeout jaw having a pocket oriented in a first direction, and defining a second direction perpendicular to the first direction (step 91); mounting a fixed retainer on the takeout jaw (step 92); mounting a dual retainer on the takeout jaw (step 93); positioning a fixed insert in the pocket in a fixed configuration by engaging the fixed insert with both the fixed retainer and the dual retainer such that motion by the fixed insert is prevented in the second direction (step 94); and to reconfigure the takeout jaw: removing the fixed insert from the pocket and positioning a floating insert in the pocket in a floating configuration by engaging the fixed insert with only the dual retainer such that the floating insert has a range of motion in the second direction (step 95); before ending as indicated at step 96.

The method also may comprise using retaining clips to engage and retain respective ones of the fixed and floating inserts. In addition, the method may further comprising forming chamfers on the fixed and floating inserts for engagement by the dual retainer; and/or providing the takeout jaw with a locating pin and a locating hole that are offset from the pocket in the second direction.

The present invention has several advantages, including the ability to provide one holder for both fixed and floating applications. Users have the option to use the fixed or floating configuration of removing glass bottles from molds without having to change to a different style of holder. This design offers a significant cost saving measure for glass bottle producers. In addition, the takeout jaws of the present invention permit higher bottle yields, are economically producible in small quantities and are characterized by decreased need for replacement of inserts.

While the invention has been shown or described in only some of its forms, it should be apparent to those skilled in the art that it is not so limited, but is susceptible to various changes without departing from the scope of the invention.

What is claimed is:

1. A takeout jaw assembly, comprising:
   a takeout jaw having a pocket for interchangeable inserts, the pocket being oriented in a first direction, and defining a second direction perpendicular to the first direction;
   fixed retention means mounted to the takeout jaw and extending into the pocket in the second direction;
   a fixed insert mountable in the pocket in a fixed configuration such that the fixed retention means engages and retains the fixed insert in the takeout jaw to prevent motion of the fixed insert in the second direction;
   a floating insert mountable in the pocket in a floating configuration such that the fixed retention means is free of engagement with the floating insert to allow motion of the floating insert in the second direction; and
   dual retention means for engaging and retaining either the fixed insert or the floating insert in the pocket while in their respective configurations.

2. A takeout jaw assembly according to claim 1, wherein the fixed insert has a fixed dimension extending in the second direction and the floating insert has a floating dimension extending in the second direction that is less than the fixed dimension.

3. A takeout jaw assembly according to claim 1, wherein the dual retention means comprises retaining clips mounted to the takeout jaw on lateral sides of the pocket.

4. A takeout jaw assembly according to claim 3, wherein the retaining clips engage chamfers formed on the fixed and floating inserts.

5. A takeout jaw assembly according to claim 1, wherein each of the fixed and floating inserts includes mechanical features for engaging the fixed retention means.

6. A takeout jaw assembly according to claim 1, wherein the fixed and floating inserts are formed from a non-metallic material.

7. A takeout jaw assembly according to claim 1, wherein the fixed and floating inserts are formed from graphite.

8. A takeout jaw assembly according to claim 1, wherein the takeout jaw has a locating pin and a locating hole that extend in the first direction and are offset from the pocket in the second direction.

* * * * *

UNITED STATES PATENT AND TRADEMARK OFFICE
CERTIFICATE OF CORRECTION

| | | |
|---|---|---|
| PATENT NO. | : 7,418,834 B2 | Page 1 of 1 |
| APPLICATION NO. | : 11/108377 | |
| DATED | : September 2, 2008 | |
| INVENTOR(S) | : David Jack Lang | |

It is certified that error appears in the above-identified patent and that said Letters Patent is hereby corrected as shown below:

- Col. 2, line 5. Reads "...typically necessary. p In U.S. Pat. No. ...", should be "...typically necessary.", and then "In U.S. Pat. No."... beginning a new paragraph;

Signed and Sealed this

Fifteenth Day of November, 2011

David J. Kappos
*Director of the United States Patent and Trademark Office*